(12) United States Patent
Golikeri et al.

(10) Patent No.: US 7,203,176 B2
(45) Date of Patent: *Apr. 10, 2007

(54) SYSTEM, DEVICE, AND METHOD FOR ADDRESS REPORTING IN A DISTRIBUTED COMMUNICATION ENVIRONMENT

(75) Inventors: Sandeep P. Golikeri, Acton, MA (US); Da-Hai Ding, Lexington, MA (US); Nicholas Ilyadis, Pepperell, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/963,779

(22) Filed: Oct. 12, 2004

(65) Prior Publication Data

US 2005/0169194 A1    Aug. 4, 2005

Related U.S. Application Data

(63) Continuation of application No. 09/340,478, filed on Jun. 30, 1999, now Pat. No. 6,888,802.

(51) Int. Cl.
*H04L 12/28* (2006.01)
*H04L 12/56* (2006.01)

(52) U.S. Cl. ..................... 370/254; 370/400
(58) Field of Classification Search ........ 370/254–256, 370/400–406

See application file for complete search history.

(56) References Cited

U.S. PATENT DOCUMENTS

| | | | |
|---|---|---|---|
| 4,296,475 A | 10/1981 | Nederlof et al. | |
| 4,597,078 A | 6/1986 | Kempf | |
| 4,725,834 A | 2/1988 | Chang et al. | |
| 4,827,411 A | 5/1989 | Arrowood et al. | |
| 4,897,841 A | 1/1990 | Gang, Jr. | |
| 5,086,428 A | 2/1992 | Perlman et al. | |
| 5,220,511 A | 6/1993 | Speckhart et al. | |

(Continued)

OTHER PUBLICATIONS

Egevang, K. and Francis, P., Internet Engineering Task Force (IETF) Request for Comments (RFC) 1631, The IP Network Address Translator (NAT), May, 1994, pp. 1-10.

*Primary Examiner*—Kevin C. Harper

(57) ABSTRACT

An address reporting technique for reporting address information in a distributed communication environment retrieves locally owned address information from each of a number of distributed address databases, sorts the address information according to a predetermined sorting scheme, and reports the sorted address information. Each address database is maintained by one of a plurality of interconnected modules. A reporting module reports address information by retrieving locally owned address information from its address database, retrieves locally owned address information from each of the other interconnected modules, sorts the address information according to a predetermined sorting scheme, and reports the sorted address information. The reporting module retrieves the locally owned address information from each of the other interconnected modules by sending a request message to the other interconnected modules and receiving a response message from each of the other interconnected modules including the locally owned address information from the module. A module that receives the request message retrieves locally owned address information from its address database, formats a response message, and sends the response message to the reporting module. The reporting module may indicate a starting address, in which case each module retrieves from its address database a predetermined number of locally owned address entries starting with a first locally owned address entry that is lexicographically greater than the starting address.

18 Claims, 5 Drawing Sheets

U.S. PATENT DOCUMENTS

| | | |
|---|---|---|
| 5,222,064 A | 6/1993 | Sagawa |
| 5,261,052 A | 11/1993 | Shimamoto et al. |
| 5,301,273 A | 4/1994 | Konishi |
| 5,343,471 A | 8/1994 | Cassagnol |
| 5,483,522 A | 1/1996 | Derby et al. |
| 5,522,042 A | 5/1996 | Fee et al. |
| 5,621,908 A | 4/1997 | Akaboshi et al. |
| 5,678,006 A | 10/1997 | Valizadeh et al. |
| 5,689,550 A | 11/1997 | Garson et al. |
| 5,805,820 A | 9/1998 | Bellovin et al. |
| 5,812,771 A | 9/1998 | Fee et al. |
| 5,884,036 A | 3/1999 | Haley |
| 5,909,564 A | 6/1999 | Alexander et al. |
| 5,923,652 A | 7/1999 | Daase et al. |
| 5,966,710 A | 10/1999 | Burrows |
| 6,023,148 A | 2/2000 | Pignolet |
| 6,094,659 A | 7/2000 | Bhatia |
| 6,098,108 A | 8/2000 | Sridhar et al. |
| 6,115,713 A | 9/2000 | Pascucci et al. |
| 6,119,188 A | 9/2000 | Sheafor et al. |
| 6,128,296 A | 10/2000 | Daruwalla et al. |
| 6,131,096 A | 10/2000 | Ng et al. |
| 6,169,794 B1 | 1/2001 | Oshimi et al. |
| 6,172,981 B1 | 1/2001 | Cox et al. |
| 6,212,529 B1 | 4/2001 | Boothby et al. |
| 6,250,548 B1 | 6/2001 | McClure et al. |
| 6,260,073 B1 | 7/2001 | Walker et al. |
| 6,307,931 B1 | 10/2001 | Vaudreuil |
| 6,308,226 B1 | 10/2001 | Kainuma |
| 6,321,227 B1 | 11/2001 | Ryu |
| 6,324,693 B1 | 11/2001 | Brodersen et al. |
| 6,331,983 B1 | 12/2001 | Haggerty et al. |
| 6,426,955 B1 | 7/2002 | Gossett Dalton, Jr. et al. |
| 6,467,006 B1 | 10/2002 | Alexander et al. |
| 6,578,086 B1 | 6/2003 | Regan et al. |
| 2002/0085586 A1 | 7/2002 | Tzeng |
| 2003/0058864 A1 | 3/2003 | Michels et al. |
| 2003/0067926 A1 | 4/2003 | Golikeri et al. |

SYSTEM, DEVICE, AND METHOD FOR ADDRESS REPORTING IN A DISTRIBUTED COMMUNICATION ENVIRONMENT

CROSS-REFERENCE TO RELATED APPLICATIONS

This application is a continuation of prior application Ser. No. 09/340,478 filed on Jun. 30, 1999, now U.S. Pat. No. 6,888,802, and which is incorporated herein by reference.

The following commonly-owned U.S. patent applications may be related to the subject patent application, and are hereby incorporated by reference in their entireties:

application Ser. No. 09/340,477 entitled SYSTEM, DEVICE, AND METHOD FOR ADDRESS MANAGEMENT IN A DISTRIBUTED COMMUNICATION ENVIRONMENT, filed in the names of Sandeep P. Golikeri, Da-Hai Ding, Nicholas Ilyadis, Timothy Cunningham, and Manish Patel on Jun. 30, 1999, now U.S. Pat. No. 6,597,700.

FIELD OF THE INVENTION

The present invention relates generally to communication systems, and more particularly to address reporting in a distributed communication environment.

BACKGROUND OF THE INVENTION

In today's information age, it is typical for computers and computer peripherals to be internetworked over a communication network. The communication network typically includes a plurality of communication links that are interconnected through a number of intermediate devices, such as bridges, routers, or switches. Information sent by a source device to a destination device traverses one or more communication links.

The various communication devices in the communication network, including the computers, computer peripherals, and intermediate devices, utilize various communication protocols in order to transport the information from the source device to the destination device. The communication protocols are typically implemented in layers, which together form a protocol stack. Each protocol layer provides a specific set of services to the protocol layer immediately above it in the protocol stack. Although there are different protocol layering schemes in use today, the different protocol layering schemes have certain common attributes. Specifically, protocols at the lowest layer in the protocol stack, which are typically referred to as the "layer 1" or "physical layer" protocols, define the physical and electrical characteristics for transporting the information from one communication device to another communication device across a single communication link. Protocols at the next layer in the protocol stack, which are typically referred to as the "layer 2" or "Medium Access Control (MAC) layer" protocols, define the protocol message formats for transporting the information across the single communication link by the physical layer protocols. Protocols at the next layer in the protocol stack, which are typically referred to as the "layer 3" or "network layer" protocols, define the protocol message formats for transporting the information end-to-end from the source device to the destination device across multiple communication links. Higher layer protocols ultimately utilize the services provided by the network protocols for transferring information across the communication network.

In order for a communication device to utilize the services of the communication network, the communication device is assigned various addresses that are used by the different protocol layers in the protocol stack. Specifically, each communication device that participates in a MAC layer protocol is assigned a MAC layer address that is used to identify the particular communication device to other communication devices participating in the MAC layer protocol. Furthermore, each communication device that participates in a network layer protocol is assigned a network layer address that is used to identify the particular communication device to other communication devices participating in the network layer protocol. Other addresses may be used at the higher layers of the protocol stack, for example, for directing the information to a particular application within the destination device.

Therefore, in order for the source device to send a message to the destination device, the source device first encapsulates the message into a network layer protocol message (referred to as a "packet" or "datagram" in various network layer protocols). The network layer protocol message typically includes a source network layer address equal to the network layer address of the source device and a destination network layer address equal to the network layer address of the destination device. The source device then encapsulates the network layer protocol message into a MAC layer protocol message (referred to as a "frame" in various MAC layer protocols). The MAC layer protocol message typically includes a source MAC layer address equal to the MAC layer address of the source device and a destination MAC layer address equal to the MAC layer address the destination device. The source device then sends the MAC layer protocol message over the communication link according to a particular physical layer protocol.

In certain situations, the source device and the destination device may be on different communication links. Therefore, an intermediate device receives the MAC layer protocol message from the source device over one communication link and forwards the MAC layer protocol message to the destination device on another communication link based upon the destination MAC layer address. Such an intermediate device is often referred to as a "MAC layer switch."

In order to forward protocol messages across multiple communication links, each intermediate device typically maintains an address database including a number of address entries, where each address entry includes filtering and forwarding information associated with a particular address. A typical address entry maps an address to a corresponding network interface. Such address entries are typically used for forwarding protocol messages by the intermediate device, specifically based upon a destination address in each protocol message. For example, upon receiving a protocol message over a particular incoming network interface and including a particular destination address, the intermediate device finds an address entry for the destination address, and processes the protocol message based upon the filtering and forwarding information in the address entry. The intermediate device may, for example, "drop" the protocol message or forward the protocol message onto an outgoing network interface designated in the address entry.

Because intermediate devices are utilized in a wide range of applications, some intermediate devices utilize a modular design that enables a number of modules to be interconnected in a stack configuration such that the number of interconnected modules interoperate in a cooperating mode of operation to form a single virtual device. Each module is capable of operating independently as a stand-alone device or in a stand-alone mode of operation, and therefore each module is a complete system unto itself. Each module typically supports a number of directly connected communication devices through a number of network interfaces.

The modular design-approach enables the intermediate device to be scalable, such that modules can be added and removed to fit the requirements of a particular application. However, the modular design approach also complicates protocol message forwarding. Specifically, when a number of modules are interconnected in a cooperating mode of operation, it is possible for the source device and the destination device to be supported by different modules. In order to forward a protocol message from the source device to the destination device, the protocol message must be forwarded between cooperating modules, and specifically from the module that supports the source device to the module that supports the destination device. Such intermodule forwarding necessitates address-to-module mappings for all addresses supported by the virtual device.

One way to maintain address-to-module mappings is to maintain a centralized address database that is used by all cooperating modules. In this centralized approach, an address entry is created in the centralized address database each time a new address is learned by a module. The address entry includes at least the address and a module identifier identifying the module that directly supports the address. In order for a module to forward a particular protocol message based upon the destination address, the module finds an address entry for the destination address in the centralized address database, retrieves the module identifier from the address entry, and forwards the protocol message to the appropriate cooperating module (which may be the module itself) based upon the module identifier.

A preferred way to maintain address-to-module mappings is for each module to maintain its own address database and to synchronize the address databases across all cooperating modules. Because each module is capable of operating independently, each module is already capable of maintaining an address database. In order to synchronize the address databases across the number of cooperating modules, each module "owns" the addresses for its directly connected communication devices, which interface with the particular module over a number of interface ports. From the perspective of a particular module, an address that is owned by that particular module is referred to as a "locally owned address," while an address that is owned by another module is referred to as a "remotely owned address." Each module maintains a number of locally owned address entries (i.e., address entries for locally owned addresses) and a number of remotely owned address entries (i.e., address entries for remotely owned addresses). A locally owned address entry includes, among other things, the locally owned address and a port identifier identifying the interface port that is associated with the locally owned address. A remotely owned address entry includes, among other things, the remotely owned address and a module identifier identifying the module that owns the address.

When all address databases are synchronized across all cooperating modules, all address databases-contain address entries for the same addresses. It is possible for a particular module to be temporarilty out of synchronization, such that the module's address database does not include an address entry for a particular address. In any case, at no time does any one address database include a list of all addresses together with the port number associated with each address. Unfortunately, it is sometimes necessary for a single module (referred to hereinafter as the "reporting module") to provide a complete list of address-to-port-number mappings to a network administrator or network manager, typically in lexicographical order.

Therefore, a technique for address reporting is needed.

SUMMARY OF THE INVENTION

In accordance with one aspect of the invention, an address reporting technique retrieves locally owned address information from each of a number of distributed address databases, sorts the address information according to a predetermined sorting scheme, and reports the sorted address information.

In accordance with another aspect of the invention, each of a plurality of interconnected modules maintains an address database including a number of locally owned address entries and a number of remotely owned address entries. A reporting module retrieves locally owned address information from its address database, retrieves locally owned address information from each of the other interconnected modules, sorts the address information according to a predetermined sorting scheme, and reports the sorted address information. The reporting module retrieves the locally owned address information from each of the other interconnected modules by sending a request message to each of the other modules requesting the locally owned address information, and receiving a response message from each of the other interconnected modules including the locally owned address information from the module. A module that receives a request message from the reporting module retrieves locally owned address information from its address database, formats a response message, and sends the response message to the reporting module.

In accordance with yet another aspect of the invention, each of a plurality of interconnected modules maintains an address database including a number of locally owned address entries and a number of remotely owned address entries. The locally owned address entries are maintained in lexicographical order by address. A reporting module retrieves a predetermined number of locally owned address entries from its address database beginning with a first locally owned address entry that is lexicographically greater than a predetermined starting address, retrieves from each of the other interconnected modules a predetermined number of locally owned address entries beginning with a first locally owned address entry that is lexicographically greater than the predetermined starting address, sorts the address information according to a predetermined sorting scheme, and reports the sorted address information. The reporting module retrieves the locally owned address information from each of the other interconnected modules by sending a request message to each of the other modules including the predetermined starting address, and receiving a response message from each of the other interconnected modules including the predetermined number of locally owned address entries from the module. A module that receives the request message from the reporting module retrieves the predetermined number of locally owned address entries beginning with the first locally owned address entry that is lexicographically greater than the predetermined starting address, formats a response message, and sends the response message to the reporting module.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
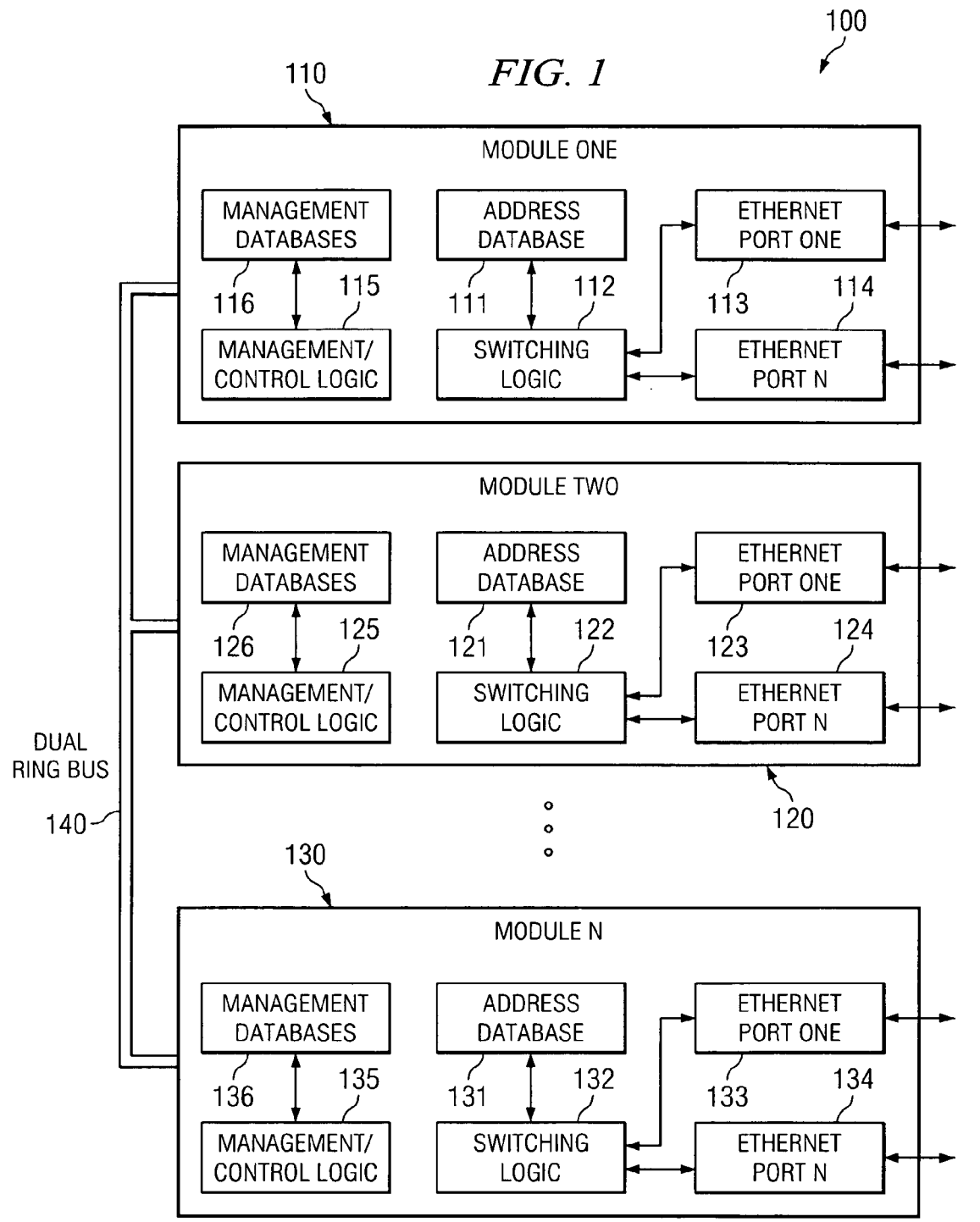
FIG. 1 is a block diagram showing an exemplary modular Ethernet switch in accordance with a preferred embodiment of the present invention.

The address reporting techniques of the present invention enable the reporting module to provide address-to-port-number mappings in lexicographical order. Specifically, each module maintains its address database in lexicographical order based upon the address in each address entry. In order to construct a list of address-to-port-number mappings in lexicographical order, the reporting module retrieves from each module (including the reporting module itself) a list of address-to-port-number mappings for each module's locally owned addresses only. Thus, each address-to-port-number mapping retrieved by the reporting module includes an address and its corresponding port number. The reporting module then sorts the various address-to-port-number mappings into lexicographical order, thereby compiling a single lexicographically ordered list of address-to-port-number mappings.

In order to retrieve the address-to-port-number mappings from the other modules, the reporting module causes an address-report request message to be sent to the other modules. Each receiving module sends to the reporting module a number of address-to-port number mappings in lexicographical order for locally owned addresses only.

In a preferred embodiment of the present invention, the reporting module retrieves only a partial list of address-to-port-number mappings at a time in order to compile a partial list of address-to-port-number mappings. Specifically, the reporting module retrieves from each module (including the reporting module itself) a predetermined number of address-to-port-number mappings for locally owned addresses that are lexicographically greater than a predetermined starting address. The reporting module then sorts the various address-to-port-number mappings into lexicographical order, thereby compiling a partial list of address-to-port-number mappings in lexicographical order.

In order to retrieve a predetermined number of address-to-port-number mappings for locally owned addresses that are lexicographically greater than a predetermined starting address from each of the other modules, the reporting module causes an address-report request message including the predetermined starting address to be sent to the other modules. Each receiving module sends to the reporting module a number of address-to-port number mappings in lexicographical order for locally owned addresses that are lexicographically greater than the predetermined starting address.

After sorting the partial list of address-to-port-number mappings, the reporting module may retrieve additional address-to-port-number mappings by sending another address-report request message including, as the starting address, the lexicographically last address from the prior partial list of address-to-port-number mappings. Each receiving module sends to the reporting module a number of address-to-port number mappings in lexicographical order for locally owned addresses that are lexicographically greater than the lexicographically last address from the prior partial list of address-to-port-number mappings.

In one exemplary embodiment of the present invention, the address reporting techniques of the present invention are used to report address-to-port-number mappings in a modular Ethernet switching system including a number of interconnected Ethernet switching modules that each support an address database.

In a preferred embodiment of the present invention, each Ethernet switching module is a particular device that is known as the BayStack™ 450 stackable Ethernet switch. The preferred Ethernet switching module can be configured to operate as an independent stand-alone device, or alternatively up to eight (8) Ethernet switching modules can be interconnected in a stack configuration, preferably by interconnecting the up to eight (8) Ethernet switching modules through a dual ring bus having a bandwidth of 2.5 gigabits per second. Within the stack configuration, a particular Ethernet switching module can be configured to operate in either a stand-alone mode, in which the particular Ethernet switching module performs Ethernet switching independently of the other Ethernet switching modules in the stack, or a cooperating mode, in which the particular Ethernet switching module performs Ethernet switching in conjunction with other cooperating Ethernet switching modules. Furthermore, a particular Ethernet switching module in the stack can be dynamically reconfigured between the stand-alone mode and the cooperating mode without performing a system reset or power cycle of the particular Ethernet switching module, and Ethernet switching modules can be dynamically added to the stack and removed from the stack without performing a system reset or power cycle of the other Ethernet switching modules in the stack.

FIG. 1 shows an exemplary stack configuration 100 including a number Ethernet switching modules 1 through N that are interconnected through a dual ring bus 140. As shown in FIG. 1, each Ethernet switching module (110, 120, 130) supports a number of physical Ethernet ports (113, 114, 123, 124, 133, 134). Each physical Ethernet port is attached to an Ethernet Local Area Network (LAN) on which there are a number of directly connected communication devices (not shown in FIG. 1). Thus, each directly connected communication device is associated with a particular physical Ethernet port on a particular Ethernet switching module.

Each Ethernet switching module (110, 120, 130) also supports an address database (111, 121, 131). In a preferred Ethernet switching module, the address database is an address table supporting up to 32K address entries. The address entries are indexed using a hashing function. The address database for a cooperating Ethernet switching module typically includes both locally owned address entries and remotely owned address entries.

Each Ethernet switching module (110, 120, 130) also includes switching logic (112, 122, 132) for processing Ethernet frames that are received over its associated physical Ethernet ports (113, 114, 123, 124, 133, 134) or from a cooperating Ethernet switching module. Specifically, the switching logic (112, 122, 132) performs filtering and forwarding of Ethernet frames based upon, among other things, the destination address in each Ethernet frame and the address entries in the address database (111, 121, 131). When the switching logic (112, 122, 132) receives an Ethernet frame over one of its associated Ethernet ports (113, 114, 123, 124, 133, 134), the switching logic (112, 122, 132) searches for an address entry in the address database (111, 121, 131) that maps the destination address in the Ethernet frame to one of the associated Ethernet ports or to one of the cooperating Ethernet switching modules. If the destination address is on the same Ethernet port (113, 114, 123, 124, 133, 134) over which the Ethernet frame was received, then the switching logic (112, 122, 132) "drops" the Ethernet frame. If the destination address is on a different one of the associated Ethernet ports (113, 114, 123, 124, 133, 134), then the switching logic (112, 122, 132) forwards the Ethernet frame to that Ethernet port (113, 114, 123, 124, 133, 134). If the destination address is on one of the cooperating Ethernet switching modules (110, 120, 130), then the switching logic (112, 122, 132) forwards the Ethernet frame to that cooperating Ethernet switching module (110, 120, 130). If the switching logic (112, 122, 132) does not find an address entry in the address database (111, 121, 131) for the destination address, then the switching logic (112, 122, 132) forwards the Ethernet frame to all associated Ethernet ports (113, 114, 123, 124, 133, 134) except for the Ethernet port over which the Ethernet frame was received and to all cooperating Ethernet switching modules (110, 120, 130).

Because each Ethernet switching module (110, 120, 130) can be configured to operate as an independent stand-alone device or in a stand-alone mode within the stack, each Ethernet switching module (110, 120, 130) includes management/control logic (115, 125, 135) that enables the Ethernet switching module (110, 120, 130) to be individually managed and controlled, for example, through a console user interface, a Simple Network Management Protocol (SNMP) session, or a world wide web session. Therefore, the preferred management/control logic (115, 125, 135) includes, among other things, a Transmission Control Protocol/Internet Protocol (TCP/IP) stack, an SNMP agent, and a web engine. Furthermore, each Ethernet switching module (110, 120, 130) is assigned MAC and IP addresses, allowing each Ethernet switching module (110, 120, 130) to send and receive management and control information independently of the other Ethernet switching modules (110, 120, 130).

The management/control logic (115, 125, 135) maintains a number of management databases (116, 126, 136) for storing configuration and operational information. The management/control logic (116, 126, 136) maintains a management database containing network management objects and parameters that are related to a particular port or interface, and maintains another management database containing network management objects and parameters that are system-wide in scope. When the Ethernet switching module (110, 120, 130) is operating in a cooperating mode within the stack, the management database containing network management objects and parameters that are system-wide in scope is referred to as the "shadowed" management database, and the management database containing network management objects and parameters that are related to a particular port or interface is referred to as the "segmented" management database. The management databases (116, 126, 136) are described in more detail below.

The management/control logic (115, 125, 135) interfaces with the other components of the Ethernet switching module (110, 120, 130) in order to manage and control the operations of the Ethernet switching module (110, 120, 130). Specifically, the management/control logic (115, 125, 135) interfaces to the address database (111, 121, 131), the switching logic (112, 122, 132), the physical Ethernet ports (113, 114, 123, 124, 133, 134), and other components of the Ethernet switching module (not shown in FIG. 1) in order to configure, monitor, and report the operational status of the Ethernet switching module (110, 120, 130) and of the individual components of the Ethernet switching module (110, 120, 130). For convenience, the various interconnections between the management/control logic (115, 125, 135) and the various other components are omitted from FIG. 1.

When operating in a stack configuration, it is often necessary for the cooperating Ethernet switching modules (110, 120, 130) to transfer information (including management information, control information, and data) over the dual-ring bus 140. Therefore, the management/control logic (115, 125, 135) provides an Inter-Module Communication (IMC) service. The IMC service supports both reliable (acknowledged) and unreliable transfers over the dual-ring bus 140. IMC information can be directed to a particular Ethernet switching module (i.e., unicast) or to all Ethernet switching modules (i.e., broadcast).

As described in the related application entitled SYSTEM, DEVICE, AND METHOD FOR ADDRESS MANAGEMENT IN A DISTRIBUTED COMMUNICATION ENVIRONMENT, which was incorporated by reference above, each Ethernet switching module (110, 120, 130) maintains locally owned address entries and remotely owned address entries in its associated address database (111, 121, 131). Each locally owned address entry includes, among other things, a locally owned address for a directly connected communication device and a port identifier identifying the physical Ethernet port (113, 114, 123, 124, 133, 134) over which the directly connected communication device is coupled to the particular Ethernet switching module (110, 120, 130). Each remotely owned address entry includes, among other things, a remotely owned address for a communication device that is directly connected to a different Ethernet switching module (110, 120, 130) and a module identifier identifying that different Ethernet switching module (110, 120, 130).

In the preferred Ethernet switching module (110, 120, 130), the management/control logic (115, 125, 135) supports various status report formats that require the management/control logic (115, 125, 135) to provide a list of address-to-port-number mappings in lexicographical order. One such status report format is an industry standard Management Information Base (MIB) that is defined in an Internet Engineering Task Force (IETF) Request For Comments (RFC) 1493 that is implemented using SNMP. Another such status report format is a console address table display that is implemented through the console user interface.

As described above, even though each address database (111, 121, 131) includes address entries for all addresses supported by the cooperating Ethernet switching modules (110, 120, 130) in the stack, no one address database (111, 121, 131) includes a list of all addresses together with the port number associated with each address. Therefore, the management/control logic (115, 125, 135) in each Ethernet switching module includes logic for compiling a single lexicographically ordered list of address-to-port-number mappings by retrieving from each cooperating Ethernet switching module (including the reporting Ethernet switching module itself) a number of address-to-port-number mappings for each module's locally owned addresses only, and sorting the various address-to-port-number mappings into lexicographical order.

More specifically, upon receiving a request for an address report (for example, from the SNMP agent or console user interface), the management/control logic (115, 125, 135) in the reporting Ethernet switching module compiles a single lexicographically ordered list of address-to-port-number mappings and reports the address-to-port-number mappings in accordance with the requested report format. Preferably, the management/control logic (115, 125, 135) in the reporting Ethernet switching module compiles a complete list of address-to-port-number mappings over a number of iterations, where, in each iteration, the management/control logic (115, 125, 135) in the reporting Ethernet switching module retrieves a partial list of address-to-port-number mappings from each of the cooperating Ethernet switching modules (including the reporting Ethernet switching module itself) that are lexicographically greater than a predetermined starting address, and then sorts the partial lists of address-to-port-number mappings into lexicographical order. In order to compile the complete list of address-to-port-number mappings, the management/control logic (115, 125, 135) in the reporting Ethernet switching modules may use a starting address equal to zero (0) for a first iteration, and thereafter typically uses a starting address equal to the lexicographically last address from the previous iteration for each subsequent iteration.

In order to retrieve a partial list of address-to-port-number mappings from its associated address database for a particular iteration, the management/control logic (115, 125, 135) in the reporting Ethernet switching module finds a first locally owned address entry in its associated address database (111, 121, 131) that is lexicographically greater than the starting address, and retrieves from its associated address database (111, 121, 131) a predetermined number of successive locally owned address entries beginning with a first locally owned address entry that is lexicographically greater than the starting address in the address-report request message. Each locally owned address entry includes an address and a corresponding port identifier. The management/control logic (115, 125, 135) in the reporting Ethernet switching module thereby obtains a partial list of address-to-port-number mappings for locally owned addresses.

In order to retrieve a partial list of address-to-port-number mappings from each of the other cooperating Ethernet switching modules in the stack for a particular iteration, the management/control logic (115, 125, 135) in the reporting Ethernet switching module causes an address-report request message to be sent to the other cooperating Ethernet switching modules over the dual ring bus 140. The management/control logic (115, 125, 135) in the reporting Ethernet switching module includes in the address-report request message the starting address for the particular iteration.

Upon receiving the address-report request message over the dual ring bus 140, the management/control logic (115, 125, 135) in each of the receiving Ethernet switching modules finds a first locally owned address entry in its associated address database (111, 121, 131) that is lexicographically greater than the starting address in the address-report request message, and retrieves from its associated address database (111, 121, 131) a predetermined number of successive locally owned address entries beginning with a first locally owned address entry that is lexicographically greater than the starting address in the address-report request message. Each locally owned address entry includes an address and a corresponding port identifier. The management/control logic (115, 125, 135) in each of the receiving Ethernet switching modules thereby obtains a partial list of address-to-port-number mappings for its locally owned addresses. The management/control logic (115, 125, 135) in each of the receiving Ethernet switching modules then formats an address-report response message including the predetermined number of address-to-port-number mappings for its locally owned addresses, and transmits the address-report response message to the reporting Ethernet switching module over the dual ring bus 140.

Upon retrieving the partial list of address-to-port-number mappings from its associated address database, and upon receiving an address-report response message from each of the other cooperating Ethernet switching modules including the partial list of address-to-port-number mappings from each of those cooperating Ethernet switching modules, the management/control logic (115, 125, 135) in the reporting Ethernet switching module sorts the address-to-port-number mappings into lexicographical order. In a preferred embodiment of the present invention, each partial list of address-to-port-number mappings is in lexicographical order, although each partial list of address-to-port-number mappings includes a distinct set of addresses. The management/control logic (115, 125, 135) in the reporting Ethernet switching module therefore sorts the address-to-port-number mappings by stepping through the partial lists in a parallel manner in order to extract the address-to-port-number mappings in lexicographical order. When the management/control logic (115, 125, 135) in the reporting Ethernet switching module finds the lexicographically last address-to-port-number mapping for the iteration, the management/control logic (115, 125, 135) in the reporting Ethernet switching module may retrieve additional address-to-port-number mappings by using the lexicographically last address from the iteration as the starting address for the next iteration.

Figure 2:
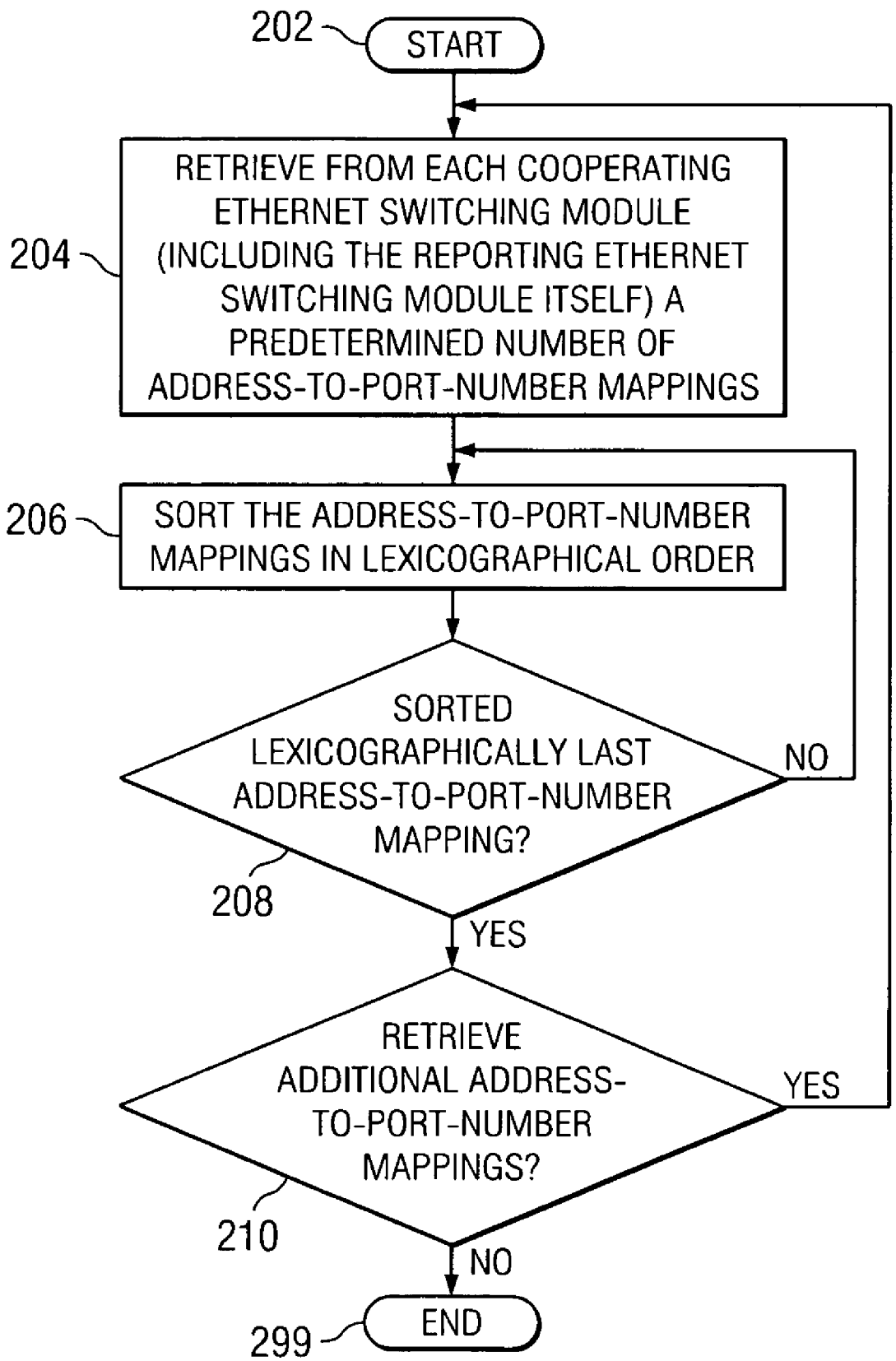
FIG. 2 is a logic flow diagram showing exemplary logic for reporting address information in accordance with a preferred embodiment of the present invention.

Thus, a preferred Ethernet switching module includes logic for operating as the reporting Ethernet switching module among a number of cooperating Ethernet switching modules in a stack. FIG. 2 is a logic flow diagram showing exemplary management/control logic (115, 125, 135) for operating as the reporting Ethernet switching module among a number of cooperating Ethernet switching modules in a stack, and specifically for compiling the lexicographically order list of address-to-port-number mappings. In order to compile the lexicographically ordered list of address-to-port-number mappings (for example, upon receiving a request for an address report) the logic begins in step 202, and proceeds to retrieve from each of the cooperating Ethernet switching modules (including the reporting Ethernet switching module itself) a predetermined number of address-to-port-number mappings, in step 204. The logic then sorts the address-to-port-number mappings into lexicographical order, in step 206, while monitoring for the lexicographically last address-to-port-number mapping among the number of retrieved address-to-port-number mappings, in step 208. When the logic sorts the lexicographically last address-to-port-number mapping (YES in step 208), the logic proceeds to determine whether or not to retrieve additional address-to-port-number mappings, in step 210. If the logic determines to retrieve additional address-to-port-number mappings (YES in step 210), then the logic recycles to step 204. Otherwise (NO in step 210), the logic terminates in step 299.

Figure 3:
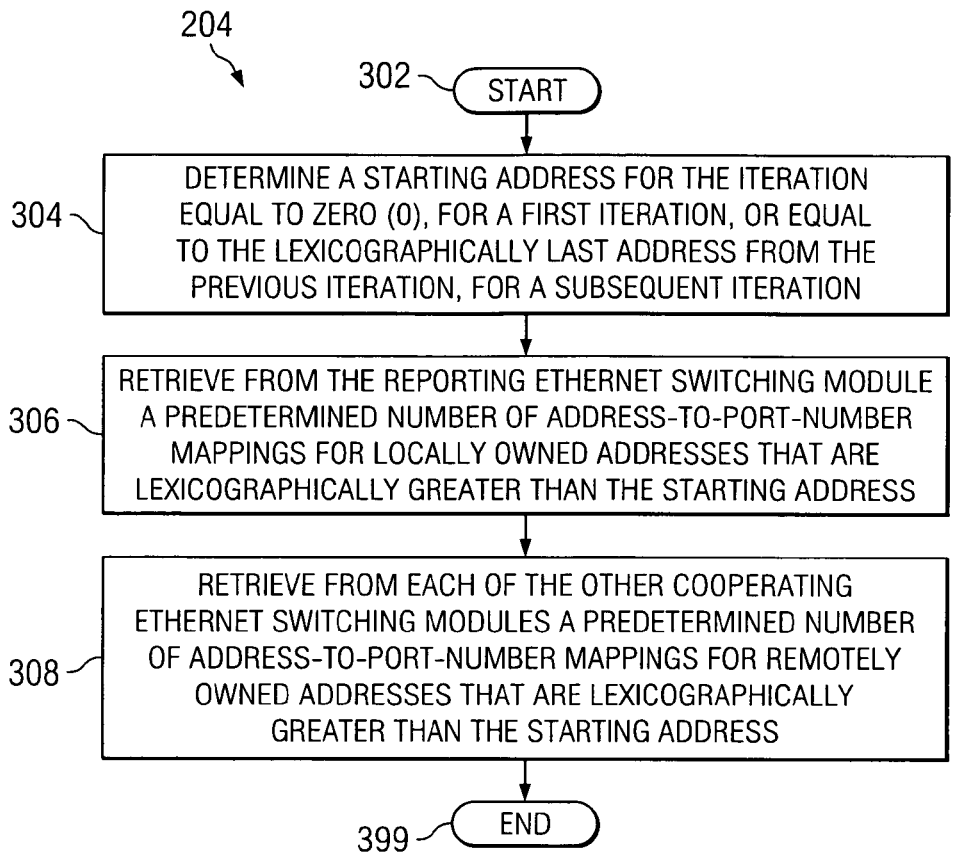
FIG. 3 is a logic flow diagram showing exemplary logic for compiling address information by a reporting module in accordance with a preferred embodiment of the present invention.

FIG. 3 is a logic flow diagram showing exemplary logic for retrieving from each of the cooperating Ethernet switching modules (including the reporting Ethernet switching module itself) the predetermined number of address-to-port-number mappings (step 204 as shown and described with reference to FIG. 2). The logic first determines a starting address for the iteration, in step 304. For example, in order to compile a complete list of address-to-port-number mappings, the starting address may be equal to zero (0) for a first iteration, and is typically equal to the lexicographically last address from the previous iteration for each subsequent iteration. After determining the starting address, in step 304, the logic retrieves from the reporting Ethernet switching module a predetermined number of address-to-port-number mappings for locally owned addresses that are lexicographically greater than the starting address, in step 306. The logic also retrieves from each of the other cooperating Ethernet switching modules a predetermined number of address-to-port-number mappings for remotely owned addresses that are lexicographically greater than the starting address, in step 308. The logic terminates in step 399.

Figure 4:
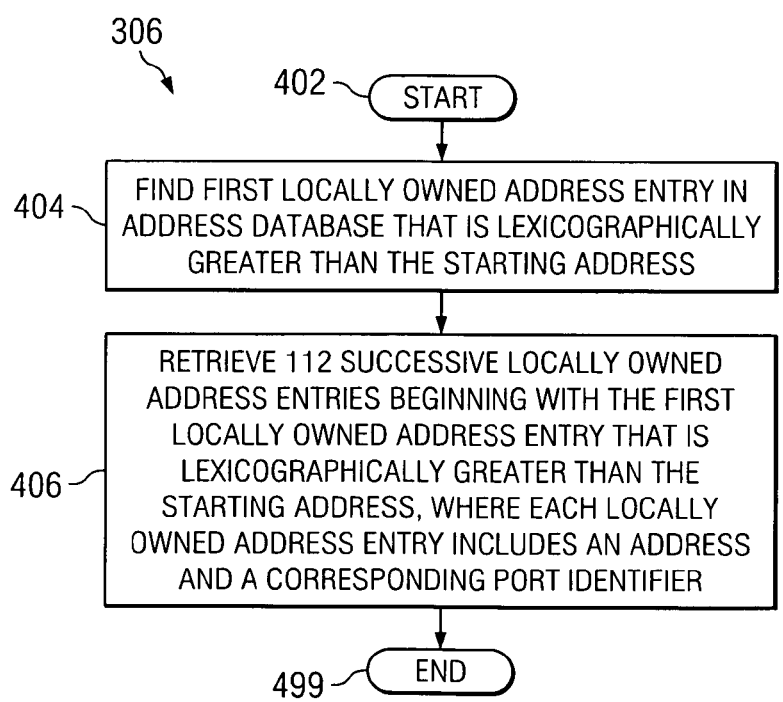
FIG. 4 is a logic flow diagram showing exemplary logic for retrieving address information from the address database in accordance with a preferred embodiment of the present invention.

FIG. 4 is a logic flow diagram showing exemplary logic for retrieving from the reporting Ethernet switching module the predetermined number of address-to-port-number mappings for locally owned addresses that are lexicographically greater than the starting address (step 306 as shown and described with reference to FIG. 3). Beginning in step 402, the logic finds the first locally owned address entry in the address database that is lexicographically greater than the starting address, in step 404. The logic then retrieves 112 successive locally owned address entries beginning with the first locally owned address entry that is lexicographically greater than the starting address, in step 406. Each locally owned address entry includes an address and a corresponding port identifier. The logic terminates in step 499.

Figure 5:
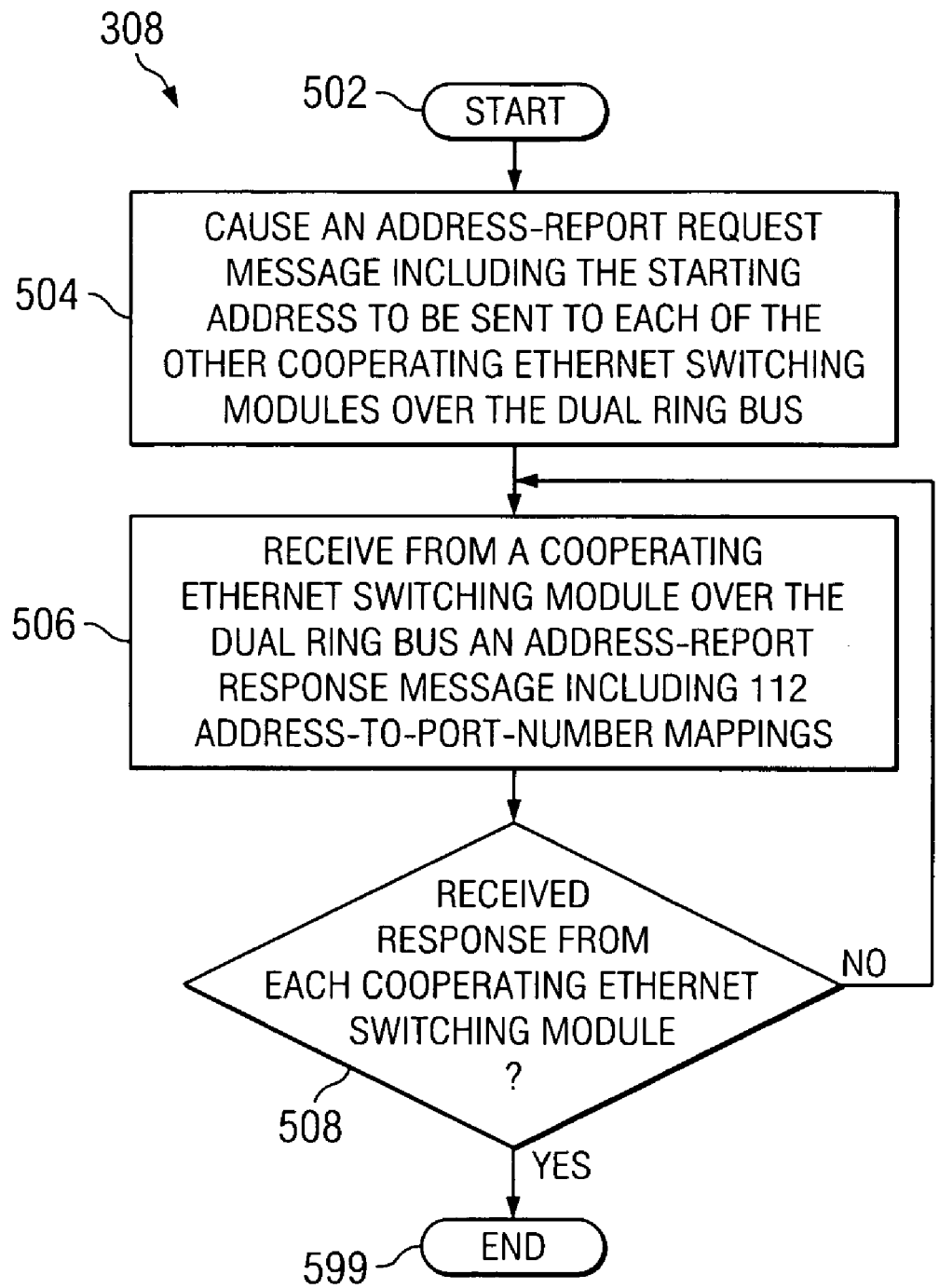
FIG. 5 is a logic flow diagram showing exemplary logic for retrieving address information from each of the other interconnected modules in accordance with a preferred embodiment of the present invention.

FIG. 5 is a logic flow diagram showing exemplary logic for retrieving from each of the other cooperating Ethernet switching modules the predetermined number of address-to-port-number mappings for remotely owned addresses that are lexicographically greater than the starting address (step 308 as shown and described with reference to FIG. 3). Beginning in step 502, the logic causes an address-report request message to be sent to the other cooperating Ethernet switching modules over the dual ring bus 140 including the starting address, in step 504. The logic then receives an address-report response message from a cooperating Ethernet switching module over the dual ring bus 140 including 112 address-to-port-number mappings, in step 506. The logic monitors the dual ring bus for an address-report response message for each of the cooperating Ethernet switching modules, recycling to step 506 to receive each address-report response message (NO in step 508), and terminating in step 599 upon receiving an address-report response message from all of the cooperating Ethernet switching modules (YES in step 508).

Figure 6:
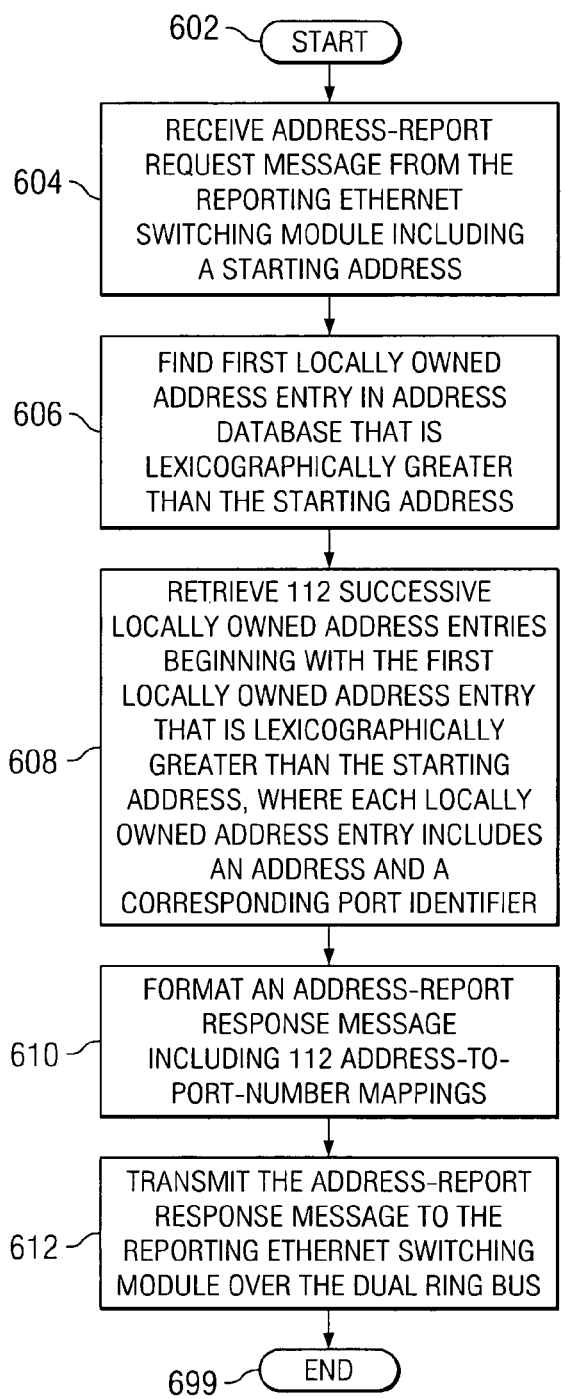
FIG. 6 is a logic flow diagram showing exemplary logic for providing address information by an interconnected module to the reporting module in accordance with a preferred embodiment of the present invention.

FIG. 6 is a logic flow diagram showing exemplary management/control logic (115, 125, 135) for operating as a receiving Ethernet switching module among a number of cooperating Ethernet switching modules in a stack. Beginning in step 602, and upon receiving an address-report request message from the reporting Ethernet switching module including a starting address in step 604, the logic finds a first locally owned address entry in its associated address database (111, 121, 131) that is lexicographically greater than the starting address, in step 606. The logic then retrieves 112 successive locally owned address entries beginning with the first locally owned address entry that is lexicographically greater than the starting address, in step 608. Each locally owned address entry includes an address and a corresponding port identifier. The logic formats an address-report response message including 112 address-to-port-number mappings, in step 610, and transmits the address-report response message to the reporting Ethernet switching module over the dual ring bus 140, in step 612. The logic terminates in step 699.

Figure 7:
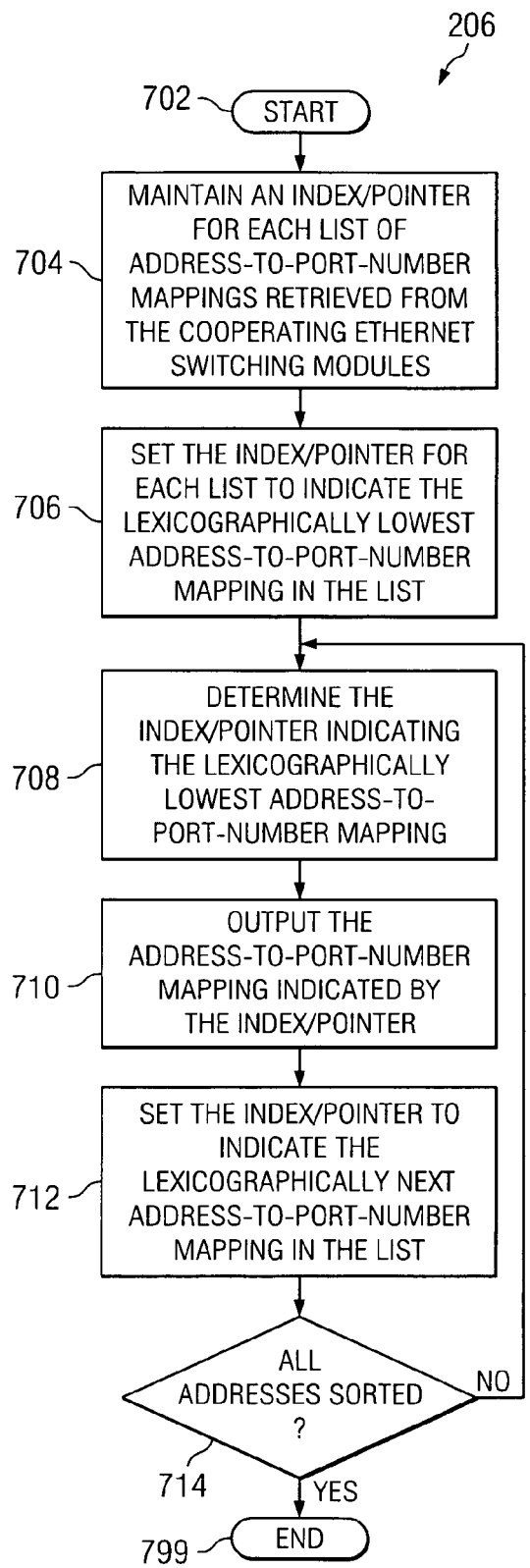
FIG. 7 is a logic flow diagram showing exemplary logic for sorting address-to-port-number mappings using a parallel sorting technique in accordance with a preferred embodiment of the present invention.

FIG. 7 is a logic flow diagram showing exemplary logic for sorting the address-to-port-number mappings into lexicographical order using a parallel sorting technique (step 206 as shown and described with reference to FIG. 2). Beginning in step 702, the logic in step 704 maintains an index/pointer for each list of address-to-port-number mappings retrieved from the cooperating Ethernet switching modules in step 204. The logic then sets the index/pointer for each list to indicate the lexicographically lowest address-to-port-number mapping in the list, in step 706. The logic then iteratively steps through the lists, using the index/pointer for each list to determine a lexicographically lowest address-to-port-number mapping from among the unsorted address-to-port-number mappings. Specifically, for each iteration, the logic determines the index/pointer indicating the lexicographically lowest address-to-port-number mapping, in step 708, outputs the address-to-port-number mapping indicated by the index/pointer, in step 710, and sets the index/pointer to indicate the lexicographically next address-to-port-number mapping in the list, in step 712. If the logic has not sorted all addresses (NO in step 714), then the logic recycles to step 708 for a next iteration. When the logic has sorted all addresses (YES in step 714), then the logic terminates in step 799.

When the management/control logic (115, 125, 135) in the reporting Ethernet switching module retrieves address-to-port-number mappings from the other cooperating Ethernet switching modules in the stack, a number of messages (specifically, the address-report request and address-report response messages) are exchanged over the dual ring bus 140, and each module reads a number of address-to-port-number entries from its address database. The frequency with which the management/control-logic (115, 125, 135) in the reporting Ethernet switching module retrieves address-to-port-number mappings therefore affects the amount of dual ring bus 140 overhead as well as processor loading of the modules, which in turn impact the responsiveness of the management/control logic (115, 125, 135) in reporting the address-to-port-number mappings. Therefore, the management/control logic (115, 125, 135) in the reporting Ethernet switching module retrieves multiple address-to-port-number mappings from each of the cooperating Ethernet switching modules during-each iteration, and caches the address-to-port-number mappings so that the information is available for responding to subsequent address report requests. Such caching helps to reduce the amount of dual ring bus 140 overhead as well as processor loading of the modules.

In a preferred embodiment of the present invention, the management/control logic (115, 125, 135) in the reporting Ethernet switching module retrieves 112 address-to-port-number mappings from each of the cooperating Ethernet switching modules (including the reporting Ethernet switching module itself) during each iteration. This is a sufficient number of address-to-port-number mappings for eight (8) console address table display screens. Thus, assuming the stack includes N cooperating Ethernet switching modules, then the management/control logic (115, 125, 135) in the reporting Ethernet switching module obtains **112*N address-to-port-number mappings in each iteration, which is a sufficient number of address-to-port-number mappings for 8*N** console address table display screens. Otherwise, the value of 112 has no particular significance, and the value can be selected based upon other selection criteria.

In a preferred embodiment of the present invention, predominantly all of the management/control logic (115, 125, 135) is implemented as a set of computer program instructions that are stored in a computer readable medium and executed by an embedded microprocessor system within the Ethernet switching module (110, 120, 130). Preferred embodiments of the invention may be implemented in any conventional computer programming language. For example, preferred embodiments may be implemented in a procedural programming language (e.g., "C") or an object oriented programming language, (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for reporting address information in a distributed communication system having a plurality of distributed address databases, wherein each address database includes a number of locally owned address entries containing locally owned address information and a number of remotely owned address entries containing remotely owned address information, involving retrieving locally owned address information from each of the distributed address databases, sorting the address information according to a predetermined sorting scheme, and reporting the sorted address information. Preferably, each address database is maintained by one of a plurality of interconnected modules within the communication system, where each module includes a number of interfaces. Also, each locally owned address entry includes a locally owned address and an interface identifier identifying an interface from which the locally owned address is learned, and each remotely owned address entry includes a remotely owned address and a module identifier identifying a module from which the remotely owned address is learned. A reporting module retrieves a list of locally owned address information from its address database, retrieves a list of locally owned address information from each of the other interconnected modules, sorts the retrieved address information according to a predetermined sorting scheme, and reports the sorted address information. Retrieving the list of locally owned address information by the reporting module from its address database involves retrieving a predetermined number of locally owned address entries from the address database. Preferably, the locally owned address entries are maintained in lexicographical order by address, and the reporting module retrieves the predetermined number of locally owned address entries beginning with a first locally owned address entry that is lexicographically greater than a predetermined starting address. Retrieving the list of locally owned address information from each of the other interconnected modules involves causing a request message to be sent by the reporting module to each of the other interconnected modules requesting the list of locally owned address information from each of the other interconnected modules, retrieving locally owned address information by each of the other interconnected modules from its respective address database, formatting a response message by each of the other interconnected modules including the locally owned address information, and sending the response message by each of the other interconnected modules to the reporting module. Retrieving the locally owned address information by each of the other interconnected modules from its respective address database involves retrieving a predetermined number of locally owned address entries from the address database. Preferably, the locally owned address entries are maintained in lexicographical order by address, and each of the other interconnected modules retrieves the predetermined number of locally owned address entries beginning with a first locally owned address entry that is lexicographically greater than a predetermined starting address that is included by the reporting module in the request message. Preferably, a parallel sorting technique is used to sort the retrieved lists of address information. The retrieved address information may be cached in a cache memory.

The present invention may also be embodied as a module for reporting address information in a communication system having a plurality of interconnected modules, where the module includes an address database, address maintenance logic for maintaining a number of locally owned address entries containing locally owned address information and a number of remotely owned address entries containing remotely owned address information in the address database, local retrieval logic for retrieving locally owned address information from the address database, remote retrieval logic for retrieving locally owned address information from each of the other interconnected modules, sorting logic for sorting the address information according to a predetermined sorting scheme, and reporting logic for reporting the sorted address information.

The present invention may also be embodied as a computer program that is stored in a computer readable medium, where the computer program includes address maintenance logic for maintaining a number of locally owned address entries containing locally owned address information and a number of remotely owned address entries containing remotely owned address information in an address database, local retrieval logic for retrieving locally owned address information from the address database, remote retrieval logic for retrieving locally owned address information from each of the other interconnected modules, sorting logic for sorting the address information according to a predetermined sorting scheme, and reporting logic for reporting the sorted address information.

The present invention may further be embodied as a module for reporting address information in a communication system having a plurality of interconnected modules, where the module includes an address database, address maintenance logic for maintaining a number of locally owned address entries containing locally owned address information and a number of remotely owned address entries containing remotely owned address information in the address database, receiving logic for receiving a request message from a reporting module requesting locally owned address information, address retrieval logic for retrieving locally owned address information from the address database, response formatting logic for formatting a response message including the locally owned address information, and transmitting logic for sending the response message to the reporting module.

The present invention may also be embodied as a computer program stored in a computer readable medium, where the computer program includes address maintenance logic for maintaining a number of locally owned address entries containing locally owned address information and a number of remotely owned address entries containing remotely owned address information in an address database, receiving logic for receiving a request message from a reporting module requesting locally owned address information, address retrieval logic for retrieving locally owned address information from the address database, response formatting logic for formatting a response message including the locally owned address information, and transmitting logic for sending the response message to the reporting module.

The present invention may further be embodied as a communication system comprising a reporting module in communication with a number of other interconnected modules, wherein each of the modules maintains an address database including a number of locally owned address entries containing locally owned address information and a number of remotely owned address entries containing remotely owned address information, and wherein the reporting module reports address information by retrieving locally owned address information from its address database, retrieves locally owned address information from each of the other interconnected modules, sorts the address information according to a predetermined sorting scheme, and reports the sorted address information.

The present invention may be embodied in other specific forms without departing from the essence or essential characteristics. The described embodiments are to be considered in all respects only as illustrative and not restrictive.

We claim:

1. A method for reporting address information in a distributed modular switching system having a plurality of interconnected switching modules each having an address database, wherein each address database includes a number of locally owned address entries containing locally owned address information and a number of remotely owned address entries containing remotely owned address information, the method comprising:
   retrieving a list of locally owned address information from each address database, the locally owned address information comprising one or more address-to-port-number mappings including a locally owned address and a corresponding interface identifier;
   sorting the retrieved address information according to a predetermined sorting scheme; and
   reporting the sorted address information.

2. The method of claim 1, wherein each module includes a number of interfaces;
   each locally owned address entry includes a locally owned address and an interface identifier identifying an interface from which the locally owned address is learned; and
   each remotely owned address entry includes a remotely owned address and a module identifier identifying a module from which the remotely owned address is learned.

3. The method of claim 2, wherein:
   retrieving a list of locally owned address information from each address database comprises:
   determining a reporting module from among the plurality of interconnected modules, the plurality of interconnected modules comprising the reporting module and one or more other interconnected modules;
   retrieving a first list of locally owned address information by the reporting module from the address database maintained by the reporting module; and
   retrieving a second list of locally owned address information by the reporting module from each of the other interconnected modules;
   sorting the retrieved address information comprises sorting the address information by the reporting module according to the predetermined sorting scheme; and
   reporting the sorted address information comprises reporting the sorted address information by the reporting module.

4. The method of claim 1, wherein sorting the address information comprises sorting the address-to-port-number mappings into lexicographical order according to the locally owned address.

5. The method of claim 1, wherein the predetermined sorting scheme is a parallel sorting scheme.

6. The method of claim 5, wherein sorting the address information comprises:
   maintaining an index/pointer for each list of locally-owned address information retrieved from each of the distributed address databases;
   setting the index/pointer for each list of locally-owned address information to indicate a lexicographically lowest address entry in the list; an
   outputting address entries in lexicographical order by iteratively determining an index/pointer indicating the lexicographically lowest address entry, outputting the address entry indicated by the index/pointer, and setting the index/pointer to indicate a lexicographically next address entry in the list.

7. The method of claim 1, further comprising:
   caching the retrieved address information in a cache memory; and
   using the cached address information to report the address information.

8. A module for reporting address information in a modular switching system including the module and one or more other interconnected modules, the module comprising:
   an address database;
   address maintenance logic operably coupled to maintain a number of locally owned address entries containing locally owned address information and a number of remotely owned address entries containing remotely owned address information in the address database;
   local retrieval logic operably coupled to retrieve a first list of locally owned address information from the address database, the first list of locally owned address information comprising one or more address-to-port-number mappings including a locally owned address and a corresponding interface identifier;
   remote retrieval logic operably coupled to retrieve a second list of locally owned address information from each of the other interconnected modules, the second list of locally owned address information comprising one or more address-to-port-number mappings including a locally owned address and a corresponding interface identifier for each of the other interconnected modules;
   sorting logic responsive to the local retrieval logic and the remote retrieval logic and operably coupled to sort the retrieved address information according to a predetermined sorting scheme; and
   reporting logic operably coupled to report the sorted address information.

9. The module of claim 8, wherein the remote retrieval logic comprises:
   transmitting logic operably coupled to cause a request message to be sent to each of the interconnected modules requesting the second list of locally owned address information from each of the other interconnected modules; and
   receiving logic operably coupled to receive from each of the interconnected modules a response message including the second list of locally owned address information from the interconnected module.

10. The module of claim 8, wherein the sorting logic is operably coupled to sort the address-to-port-number mappings into lexicographical order by address.

11. The module of claim 10, wherein the sorting logic is operably coupled to maintain an index/pointer for each retrieved list of locally-owned address information, set the index/pointer for each list of locally-owned address information to indicate a lexicographically lowest address entry in the list, and output address entries in lexicographical order by iteratively determining the index/pointer indicating the lexicographically lowest address entry, outputting the address entry indicated by the index/pointer, and setting the index/pointer to indicate the lexicographically next address entry in the list.

12. The module of claim 8, further comprising caching logic operably coupled to store the retrieved address information in a cache memory.

13. A program product comprising a computer readable medium having embodied therein a computer program for reporting address information in a modular switching system having a plurality of interconnected modules, the computer program comprising:
   address maintenance logic programmed to maintain a number of locally owned address entries containing locally owned address information and a number of remotely owned address entries containing remotely owned address information in an address database;
   local retrieval logic programmed to retrieve a first list of locally owned address information from the address database, the first list of locally owned address information comprising one or more address-to-port-number mappings including a locally owned address and a corresponding interface identifier;
   remote retrieval logic programmed to retrieve at least one second list of locally owned address information from at least one of the interconnected modules, the second list of locally owned address information comprising one or more address-to-port-number mappings including a locally owned address and a corresponding interface identifier;
   sorting logic responsive to the local retrieval logic and the remote retrieval logic and programmed to sort the retrieved address information according to a predetermined sorting scheme; and
   reporting logic programmed to report the sorted address information.

14. The program product of claim 13, wherein the remote retrieval logic comprises:
   transmitting logic programmed to cause a request message to be sent to each of the interconnected modules requesting the second list of locally owned address information from each of the other interconnected modules; and
   receiving logic programmed to receive from each of the interconnected modules a response message including the second list of locally owned address information from the interconnected module.

15. The program product of claim 13, wherein the sorting logic is programmed to sort the address-to-port-number mappings into lexicographical order by address.

16. The program product of claim 15, wherein the sorting logic is programmed to maintain an index/pointer for each retrieved list of locally-owned address information, set the index/pointer for each list of locally-owned address information to indicate a lexicographically lowest address entry in the list, and output address entries in lexicographical order by iteratively determining the index/pointer indicating the lexicographically lowest address entry, outputting the address entry indicated by the index/pointer, and setting the index/pointer to indicate the lexicographically next address entry in the list.

17. The program product of claim 13, wherein the computer program further comprises caching logic programmed to store the retrieved address information in a cache memory.

18. The method of claim 1, wherein retrieving a list of locally owned address information from each address database comprises:
   sending a request message from a one of the plurality of interconnected modules to each of the other interconnected modules requesting locally owned address information from each of the other interconnected modules; and
   receiving a response message at the one of the plurality of interconnected modules from each of the other interconnected modules that includes the locally owned address information from each of the other interconnected modules.

* * * * *